US010310699B1

(12) United States Patent
Jain et al.

(10) Patent No.: US 10,310,699 B1
(45) Date of Patent: Jun. 4, 2019

(54) DYNAMIC MODIFICATION OF BROWSER AND CONTENT PRESENTATION

(71) Applicant: Amazon Technologies, Inc., Seattle, WA (US)

(72) Inventors: Saral Jain, Bellevue, WA (US); Anthony N. Bice, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 429 days.

(21) Appl. No.: 14/563,663

(22) Filed: Dec. 8, 2014

(51) Int. Cl.
*G06F 17/00* (2019.01)
*G06F 3/0481* (2013.01)
*G06F 16/957* (2019.01)
*G06F 3/0484* (2013.01)
*G06F 17/21* (2006.01)
*G06F 16/95* (2019.01)
*G06F 16/954* (2019.01)

(52) U.S. Cl.
CPC ........ *G06F 3/0481* (2013.01); *G06F 16/9577* (2019.01); *G06F 3/0484* (2013.01); *G06F 3/04842* (2013.01); *G06F 16/95* (2019.01); *G06F 16/954* (2019.01); *G06F 16/957* (2019.01); *G06F 17/211* (2013.01); *G06F 17/212* (2013.01)

(58) Field of Classification Search
CPC ........... G06F 17/30905; G06F 3/04842; G06F 3/04847; G06F 17/211; G06F 17/212; G06F 17/30861; G06F 17/30873; G06F 17/30899; G06F 3/0481; G06F 3/0484
See application file for complete search history.

(56) References Cited

U.S. PATENT DOCUMENTS

| | | | | |
|---|---|---|---|---|
| 6,535,912 B1 * | 3/2003 | Anupann | .......... | G06F 17/30884 707/E17.114 |
| 7,359,935 B1 * | 4/2008 | Karipides | ......... | G06F 17/30893 707/999.006 |
| 7,401,289 B2 * | 7/2008 | Lachhwani | .......... | G06F 17/212 707/E17.116 |
| 8,117,553 B2 * | 2/2012 | Danninger | ........ | G06F 17/30899 715/764 |
| 8,175,511 B1 * | 5/2012 | Sordo | ...................... | G09B 7/00 434/118 |

(Continued)

OTHER PUBLICATIONS

Google, World Clocks—chrome web store, Last Updated Dec. 28, 2012, Google, 1 page/screenshot htttps://chrome.google.com/webstore/detail/world-clocks/innfmeekncjandlanpgdmmogkcimekgo?hl=en.*

(Continued)

*Primary Examiner* — William L Bashore
*Assistant Examiner* — David Faber
(74) *Attorney, Agent, or Firm* — Knobbe, Martens, Olson & Bear, LLP

(57) ABSTRACT

Features are disclosed for providing a browsing experience for users where the browser interface and/or page layout are modified based on aggregated user preference data. Various browser modules can be exposed for a given content page based on analyzing data representing interactions of users with browser modules while viewing the content page. Accordingly, the modules exposed to users viewing the page can include useful functionalities for interacting with the content. Content page layouts can also be dynamically modified based on analyzed interactions of users with elements of the content page.

20 Claims, 6 Drawing Sheets

(56) References Cited

U.S. PATENT DOCUMENTS

| | | | | |
|---|---|---|---|---|
| 8,234,582 | B1* | 7/2012 | Haynes | G06Q 30/02 715/736 |
| 8,327,349 | B2* | 12/2012 | Chu | G06F 9/44526 717/174 |
| 8,645,411 | B1* | 2/2014 | Bandaru | G06F 17/3089 707/709 |
| 8,667,480 | B1* | 3/2014 | Sigurdsson | G06F 9/44526 717/168 |
| 8,881,021 | B1* | 11/2014 | Das | G06F 8/38 715/744 |
| 9,058,401 | B2* | 6/2015 | Jiang | G06F 17/30899 |
| 9,092,817 | B2* | 7/2015 | Allocca | G06Q 20/203 |
| 9,129,027 | B1* | 9/2015 | Hamedi | G06F 17/30867 |
| 9,240,023 | B1* | 1/2016 | Varangaonkar | G06Q 30/0633 |
| 9,323,724 | B2* | 4/2016 | Liang | G06F 17/2247 |
| 9,454,515 | B1* | 9/2016 | Jain | G06F 17/2247 |
| 9,767,212 | B2* | 9/2017 | Lavi | G06F 17/30905 |
| 2001/0029527 | A1* | 10/2001 | Goshen | G06F 17/30899 709/218 |
| 2002/0032673 | A1* | 3/2002 | Yen | G06F 17/30899 |
| 2002/0059373 | A1* | 5/2002 | Boys | G09B 5/00 709/204 |
| 2003/0028591 | A1* | 2/2003 | Goloshubin | G06F 9/451 709/203 |
| 2003/0112271 | A1* | 6/2003 | Batalden | G06F 17/30905 715/744 |
| 2003/0229900 | A1* | 12/2003 | Reisman | G06F 17/30873 725/87 |
| 2005/0154716 | A1* | 7/2005 | Watson | G06F 17/30648 |
| 2005/0188318 | A1* | 8/2005 | Tamir | G06F 11/3438 715/744 |
| 2006/0095835 | A1* | 5/2006 | Kennedy | G06F 17/211 715/234 |
| 2006/0123340 | A1* | 6/2006 | Bailey | G06F 9/44526 715/700 |
| 2007/0150816 | A1* | 6/2007 | Hariki | G06Q 10/06 715/733 |
| 2007/0174424 | A1* | 7/2007 | Chen | G06F 9/44526 709/217 |
| 2008/0201634 | A1* | 8/2008 | Gibb | G06F 17/30905 715/256 |
| 2009/0024488 | A1* | 1/2009 | Romley | G06Q 10/10 705/80 |
| 2010/0011352 | A1* | 1/2010 | Chu | G06F 9/44526 717/174 |
| 2010/0017704 | A1 | 1/2010 | Jaffe et al. | |
| 2010/0198768 | A1* | 8/2010 | Zhou | G06F 9/453 706/47 |
| 2010/0228963 | A1* | 9/2010 | Kassab | G06Q 30/02 713/150 |
| 2011/0239044 | A1* | 9/2011 | Kumar | G06Q 20/02 714/15 |
| 2011/0271175 | A1* | 11/2011 | Lavi | G06F 17/30905 715/234 |
| 2012/0304073 | A1* | 11/2012 | Mandic | G06F 17/30873 715/745 |
| 2013/0031470 | A1* | 1/2013 | Daly, Jr. | G06F 17/30867 715/243 |
| 2013/0041881 | A1* | 2/2013 | Wierman | G06F 17/30864 707/709 |
| 2013/0073509 | A1* | 3/2013 | Burkard | G06F 17/30864 706/52 |
| 2013/0124641 | A1* | 5/2013 | Ryabchun | G06F 11/3495 709/206 |
| 2013/0227394 | A1* | 8/2013 | Sazhin | G06F 17/30899 715/234 |
| 2013/0253994 | A1* | 9/2013 | Brower | G06Q 20/22 705/12 |
| 2014/0279213 | A1* | 9/2014 | Swenson | G06Q 30/0633 705/26.8 |
| 2014/0337800 | A1* | 11/2014 | Gray | G06F 1/1626 715/835 |
| 2015/0193547 | A1* | 7/2015 | Burkard | H04L 67/42 709/203 |
| 2015/0371222 | A1* | 12/2015 | Carroll | G06Q 20/38 705/39 |
| 2016/0124580 | A1* | 5/2016 | Chen | G06F 17/30861 715/745 |

OTHER PUBLICATIONS

F5, "Caching Behavior of Web Browsers", f5.com, Feb. 5, 2014 https://f5.com/resources/white-papers/caching-behavior-of-web-browsers.* pcmag.com, "Definition of:browser cache", pcmag, May 11, 2013 https://web.archive.org/web/20130511025428/https://www.pcmag.com/encyclopedia/term/38971/browser-cache.*

U.S. Appl. No. 13/689,377, filed Nov. 29, 2012.

Taylor, et al, U.S. Appl. No. 13/689,377, filed Nov. 29, 2012.

* cited by examiner

DYNAMIC MODIFICATION OF BROWSER AND CONTENT PRESENTATION

BACKGROUND

Browser applications typically provide various tools and features that may be used to facilitate interactions with content. For example, browsers may provide secure connections to servers, fields for submitting search terms to search engines, bookmark menus and toolbars for saving and accessing frequently visited content providers, etc. In addition, browsers often allow installation of additional tools, some of which may be developed by third parties. For example, many browsers provide for the installation of customized toolbars, plug-ins, and other software.

The user interface of a browser application is somewhat static. Toolbars and menus are used to expose the features of the browser to users. Users may position the toolbars and menus as needed, and in some cases may manually add and remove toolbars and menus. In a typical browsing session, a user may utilize a browser to search for content hosted by various web sites (e.g., by typing search terms into a field for submission to a search engine), communicate with other users (e.g., via a social network), listen to audio content, shop for goods, and the like. Each of these tasks may involve the use of different features of the browser, accessed through different toolbars, menus, and other user interface controls.

BRIEF DESCRIPTION OF THE DRAWINGS

The drawings are provided to illustrate example embodiments described herein and are not intended to limit the scope of the invention. Throughout the drawings, reference numbers may be re-used to indicate correspondence between referenced elements.

DETAILED DESCRIPTION

Introduction

Figure 1:
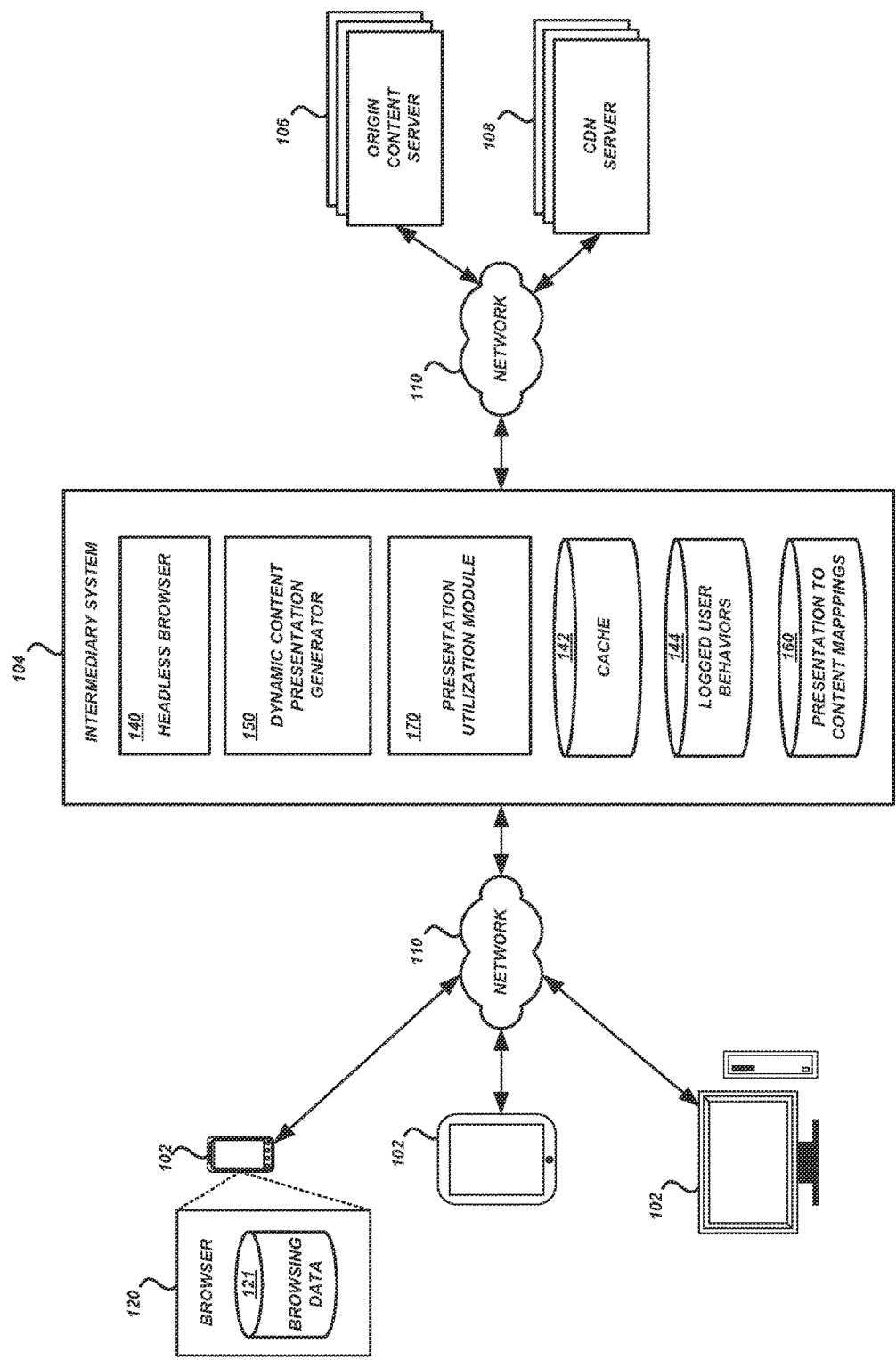
FIG. 1 illustrates a content delivery environment with an intermediary system that determines dynamic presentation of browser interfaces and content pages according to some embodiments.

The present disclosure relates to providing dynamically modified layouts for a content page (e.g., web page) based on aggregated user preference data and/or dynamically modified user interfaces for a browser. The modified user interfaces present auxiliary modules and applications that extend the functionality of web browser applications. Such auxiliary modules and applications are often referred to as plug-ins, snap-ins, extensions, toolbars, widgets, skins, themes, etc., and will be referred to herein using the umbrella term "modules." Illustratively, some of the features provided or enhanced through the use of browser modules include playback of multimedia content (e.g., as provided by the Flash add-on), viewing documents (e.g., as provided by the Acrobat™ Reader module), providing shopping functionality for users visiting e-commerce content sites (e.g., a one-click purchase or add-to-cart module), scanning for viruses, changing the appearance of the browser, and providing program execution environments (e.g., as provided by the Java™ Virtual Machine module). Some aspects of the disclosure relate to making such modules, webpage templates based on the modified layouts, and/or aggregated user preference data relating to browser interfaces and content layouts available to users through a marketplace environment or data analytics service.

Aspects of the disclosure relate to analyzing aggregated user behavioral data including interactions with browser modules and/or content sites to determine the aggregated user preference data. For example, the interactions with browser modules can include user usage of browser navigation options, browser bookmarking features, and selection of other modules when browsing particular categories of content pages. Interaction with a module by a user election when browsing a particular content page can be an implicit indication of user preference for having that module included in the browser user interface, and selection of a module for inclusion in the browser interface when browsing a particular content page can be an explicit indication of user preference for having that module included in the browser user interface when browsing that particular content page or similar content pages. Interactions with content can include click history data, length of time spent interacting with a particular element of a content page, relative number of users who interacted with the various elements of a content page, and length of time spent on a content page before interacting with a particular element. Such interactions can be analyzed to determine implicit user preferences regarding the layout of the various elements of the content page. These user preferences can be aggregated to determine modified browser interfaces and/or content layouts to present when a user requests a content page.

Additional aspects of the disclosure relate to defining multiple modified browser interfaces for a browser application. Each modified browser interface may be associated with one or more content pages or categories of content. For example, a browser application may provide any number of modules including toolbars, menus, buttons, and other UI controls. Aggregated user behavioral data including interactions with browser modules can indicate that some modules are more frequently used than others when a user is browsing certain types of content. In addition, the content of the page can be analyzed to determine modules to present when a user requests the content page (e.g., audio controls for a content site including audio content). The browser may include several different modified browser interfaces that focus on modules used or selected by users, as indicated by the aggregated browsing history data, for each of several different types of content, such as modules likely to be used when reading news articles, shopping, banking, researching, watching television, and so on. Additional features such as split-screen browsing when shopping, a notepad when performing research, dedicated destination and date entry fields for searching travel sites, and the like may be provided in a modified browser interface for presentation when a user is performing activities that may be enhanced by such features.

These modified browser interfaces can be dynamically applied to reconfigure a user browser when the user requests an associated content page or category of content page in some embodiments. Some aspects of the present disclosure relate to integration of modules a browser application such that a remote server or system (e.g., a computing device or system separate from the computing device on which the browser is installed) can manage browser modules installed and presented on multiple computing devices.

In other embodiments, the modified browser interfaces can be provided in a marketplace environment, for example to developers of content pages. The modified browser interfaces and/or the user preference data used to generate the modified browser interfaces can be provided to developers through a data analytics service in some embodiments. Via the marketplace or data analytics service, developers may be able to select a modified browser interface for their content pages (e.g., by purchasing the modified browser interface or signing up for a service offering automatic updates to a selected modified browser interface based on updated analysis of user behavioral data) in order to provide an enhanced experience for users visiting such content pages. Developers may also be able to select multiple modified browser interfaces for their content pages for presentation to different subgroups of users in some embodiments, for example a first modified browser interface for presentation to mobile computing device users and a second modified browser interface to desktop computer users.

Further aspects of the disclosure relate to defining at least one modified layout for a content page. As discussed above, aggregate user behavioral data can be analyzed to determine implicit user preferences regarding the layout of the various elements of a content page. These user preferences can be aggregated to determine modified content layouts to present when a user requests a content page. In addition, the content of the page can be analyzed to determine modified content layouts to present when a user requests the content page. In some embodiments, multiple modified layouts can be determined for a content page based on analyzing the behavioral data of different subgroups of users, for example a first modified layout based on behavioral data analyzed from a first subgroup or category of users (for instance, mobile computing device users) and a second modified layout based on behavioral data analyzed from a second subgroup or category of users (for instance, desktop computer users). As used herein, desktop computers can include laptops, desktops, or other computing devices associated with relatively large monitors or displays. Such modified layouts can be stored in association with the content page and the subgroup of users.

These modified content layouts can be dynamically applied to reconfigure a specified layout of a content page when the user requests the content page or category of content page in some embodiments. According to some aspects of the present disclosure, an intermediary system can retrieve the content and reconfigure the layout for presentation to users on a number of computing devices via a local browser application.

In addition, some embodiments may aggregate the user preference data relating to content page layout across a number of content pages to determine layout aspects that apply generally to a group or category of content pages, and may generate layout templates based on the aggregated user preference data. To illustrate, aggregated user preference data from a number of news sites can indicate a preference for navigation options positioned in an upper portion of the content page rather than along one side. An implicit indication of such a preference can be more frequent user interaction with navigation options presented in an upper portion of the page when compared to a level of interaction with navigation options presented in other portions of the page. Accordingly, a page template can be generated including navigation options positioned in the upper portion of the page. As another example, aggregated user preference data from a number of different categories of sites can indicate a preference for advertisements being positioned after or below the primary content of the page, for instance indicated by less frequent user interaction with the advertisements than with the primary content. Accordingly, a page template can be generated including advertisements positioned below primary content.

In some embodiments, these content layout templates can be provided in a marketplace environment, for example to developers of content pages. The content layout templates and/or the user preference data used to generate the content layout templates can be provided to developers through a data analytics service in some embodiments. The data analytics service may provide developers with information regarding absolute or relative popularity of elements of a content page (based, for example, on click history data in the aggregated user preference data) for use in manual restructuring of the content page layout by the developer in some embodiments. In addition, via the marketplace or data analytics service, developers may be able to select a content layout template for their content pages (e.g., by purchasing the content layout template or signing up for a service offering automatic updates to a selected content layout template based on updated analysis of user behavioral data) in order to provide an enhanced experience for users visiting such content pages. Developers may also be able to select multiple content layout templates for their content pages for presentation to different subgroups of users in some embodiments.

Although aspects of the embodiments described in this disclosure will focus, for the purpose of illustration, on features provided by a browser application executing on a client device and retrieving content from content providers, content delivery networks ("CDN"), and the like, one skilled in the art will appreciate that the techniques disclosed herein may be applied to any number of hardware or software processes or applications. For example, some or all of the browser features and processing described herein may be provided by an intermediary system. For example, a network browser or other content rendering engine may execute on a network-accessible intermediary server (e.g., an intermediary system between the client device and content provider). The content rendering engine may determine which browser modules and content layouts to provide to an end user based on content requests and the like. The content rendering engine may instruct the client device regarding which modified browser interfaces and which modified content layouts to present, or the content rendering engine may present the modified browser interfaces and which modified content layouts to the client device. However, in other embodiments the browser component on the user device may be configured with the modified browser interfaces and modified content layouts and may additionally be configured to determine which modified browser interfaces and which modified content layouts to present to the user.

Various aspects of the disclosure will now be described with regard to certain examples and embodiments, which are intended to illustrate but not limit the disclosure.

System Components

FIG. 1 illustrates an example network environment in which features can be implemented for processing content pages on an intermediary system and generating modified presentations. The network environment shown in FIG. 1 includes various user devices 102, an intermediary system 104, and various content sources, including origin content servers 106 and content delivery network ("CDN") servers 108. The system components may communicate with each other via one or more communication networks 110 in order to deliver content pages hosted on CDN servers 108 and/or origin servers 106 to user devices 102 via intermediary system 104. The intermediary system maintains browsing history data in association with the user devices 102 for use in determining user preferences for browser interface configurations and/or content layouts. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

As will be appreciated by those of skill in the relevant art, the network environment may include any number of distinct user devices 102 and/or content sources 106, 108. In addition, multiple (e.g., two or more) intermediary systems 104 may be used. For example, separate intermediary systems 104 may be located so that they are close (in either a geographical or networking sense) to groups of current or potential user devices 102 or content sources 106, 108. In such a configuration, a user device 102 may request content via the intermediary system 104 to which it is closest, rather than all user devices 102 requesting content via a single intermediary system 104. Further, as mentioned above, the system that uses the analyzed browsing behaviors to generate modified browser presentations and modified content layouts need not operate as an intermediary.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute a browser application 120 to communicate via the network 110 with other computing systems, such as the intermediary system 104 or content sources 106 and 108, in order to request and display content.

Illustratively, a user may use a browser application 120 to request network-accessible content (e.g., content pages, images, video, etc.) hosted or provided by a content source, such as an origin content server 106 or a CDN server 108. The user device 102 or browser application 120 may be associated with the intermediary system 104 or otherwise configured to request the content through, and receive content from, the intermediary system 104 rather than (or in addition to) communicating directly with the content source. The browser application 120 may include browsing data storage 121 that stores browsing history data representing user interactions with content provided to the browser application 120. In some embodiments, the browser 120 may be a conventional web browser that is not specifically designed or configured to store or analyze browsing data pertaining to user browser and page presentation preferences. In some embodiments, browser 120 can be provided with modules that store and communicate information relating to user browser and page presentation preferences, as discussed in more detail with respect to FIG. 2.

The intermediary system 104 can be a computing system configured to retrieve content on behalf of user devices 102 and send the content to the user devices 102. For example, the intermediary system 104 can be a server or group of servers that may be accessed via the network 110. In some embodiments, the intermediary system 104 may be a proxy server, a system operated by an internet service provider (ISP), and/or some other device or group of devices that retrieve content on behalf of user devices 102.

The intermediary system 104 may include various modules, components, data stores, and the like to provide content retrieval and the modified presentation functionality described herein. For example, the intermediary system 104 may include a server-based browser application or some other content rendering application to process content retrieved from content sources. Such a content rendering application may be referred to as a "headless browser" 140. Generally described, a headless browser 140 does not (or is not required to) cause display of content by a graphical display device of the server on which the headless browser 140 is executing. Instead, the headless browser 140 provides representations of the content to separate user devices 102 that enable the user devices 102 to cause display of the content. Illustratively, the headless browser 140 may obtain requested content from an origin content server 106 and/or CDN server 108, obtain additional items (e.g., images and executable code files) referenced by the requested content, execute code (e.g., JavaScript) that may be included in or referenced by the content, generate a representation of the content usable to display a graphical representation of the content, and transmit the representation to the user device 102. In some embodiments the headless browser 140 may use the user preference data gleaned from aggregated user interactions in order to modify the presentation of one or both of the client browser 120 and/or the requested content. By performing some or all of these operations at the intermediary system 104, the substantial computing resources and high-speed network connections typically available to network-based server systems may be leveraged to perform the operations much more quickly than would be possible on a user device 102 with comparatively limited processing capability. In addition, by providing content page representations to a large number of the user devices 102 and communicating with the user devices 102 over a network, the intermediary system 104 may be able to obtain browsing history data representing visits to and interactions with a large number of content pages and content sites by a large number of users. Although an intermediary system is used in the embodiment of FIG. 1, in some embodiments the disclosed features may be implemented without the use of an intermediary system. For example, the browser applications running on user devices can report the usage data to a designated, non-intermediary server system for analysis, and this server system may send back information to the user devices on how to modify the browser user interface and/or page layouts for specific sites.

The intermediary system 104 may include various modules to provide the modified presentation functionality described above and in greater detail below. For example, the intermediary system 104 may include dynamic content presentation generator 150, presentation utilization module 170, and data repositories for logged user behaviors 144 and presentation to content mappings 160. In some embodiments, presentation utilization module 170 can be implemented wholly or partly in the browser 120 on a user device 102 provided with the presentation to content mappings 160. The functionalities of and communications between these components is described in more detail with respect to FIG. 2.

As an example, the headless browser may be implemented using the open source Chromium™ browser, with appropriate modifications to implement modified presentation generation the other features described herein. In some embodiments, Chromium™ code may be modified to request and/or receive browsing history data from a number of computing devices of users, analyze the browsing history data, build a map associating content pages with user preferences, and determine modified presentations of browser components and/or content pages. Chromium™ code may also be modified to perform the various modified presentation utilization techniques described herein, for example generate instructions to present modified browser presentations or content layouts users, providing a service portal for assisting users with modifying presentation of their content pages or content sites, and providing a marketplace for browser modules and/or content layout templates. In other embodiments, a headless browser component can be developed specifically to implement the modified presentation determination and utilization techniques described herein. In further embodiments, a headless browser may be omitted and the intermediary system 104 and/or browser 120 can perform these functions.

The intermediary system 104 may include additional modules, components, data stores, and the like to provide the features described above and in greater detail below. For example, the intermediary system 104 may include a cache 142 that stores content items received form content sources 106 and 108 and the like. The intermediary system 104 may also include a logged "user behaviors" data store 144 that stores information about user requests and interactions with content as well as browsing data received from user devices.

The intermediary system 104 may be a single computing device, or it may include multiple distinct computing devices, such as computer servers, logically or physically grouped together to collectively operate as an intermediary system. The components of the intermediary system 104 can each be implemented as hardware, such as a server computing device, or as a combination of hardware and software. In addition, the modules and components of the intermediary system 104 can be combined on one server computing device or separated individually or into groups on several server computing devices. In some embodiments, the intermediary system 104 may include additional or fewer components than illustrated in FIG. 1.

In some embodiments, the features and services provided by the intermediary system 104 may be implemented as web services consumable via the communication network 110. In further embodiments, the intermediary system 104 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The origin content servers 106 and CDN servers 108 can correspond to logical associations of one or more computing devices for hosting content and servicing requests for the hosted content over the network 110. For example, a content server 106 or CDN server 108 can include a web server component corresponding to one or more server computing devices for obtaining and processing requests for content (such as content pages) from user devices 102, the intermediary system 104, or other devices or service providers. In some embodiments, one or more content servers 106 may be associated one or more CDN service providers (e.g., entities that manage multiple CDN servers 108), application service providers, etc.

Although in the examples described herein the intermediary system 104 is configured to communicate with user devices 102 to receive data representing user interactions with content and/or browser modules, in some embodiments the origin content servers 106 and/or CDN servers 108 can be configured to store such data and send the data to the intermediary system.

Example Component Communications

Figure 2:
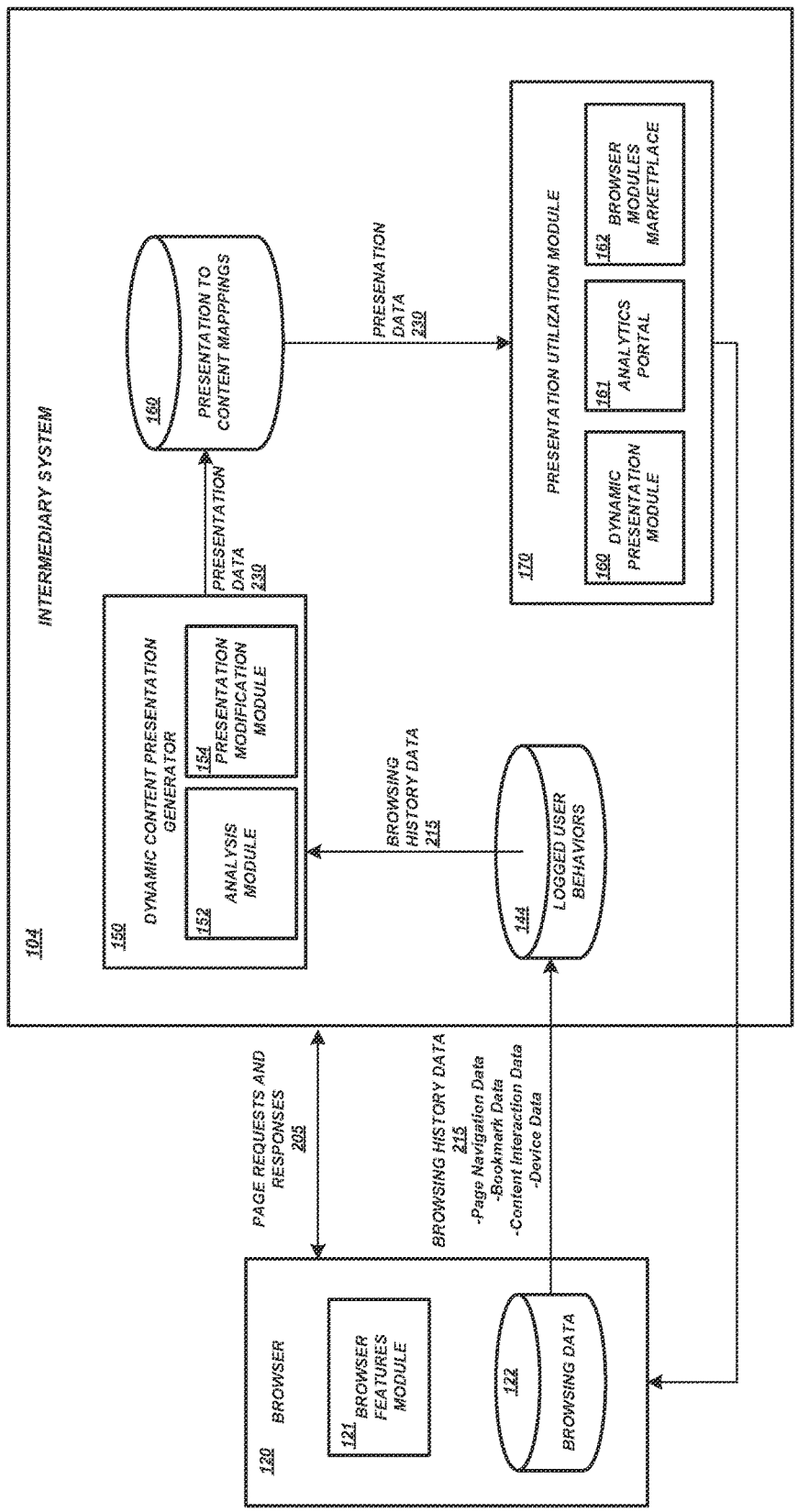
FIG. 2 illustrates example data flows and interactions between a user device and intermediary system during determination of dynamic presentation of browser interfaces and content pages according to some embodiments.

FIG. 2 illustrates example data flows and interactions between a user device and intermediary system during generation of modified presentations according to some embodiments. Although the illustrated communications involve the user device 102 and intermediary system 104 of FIG. 1, similar communications can take place between any client device and intermediary system capable of executing the modified presentation generation techniques described herein.

Browser 120 of the user device 102 can include a browsing data repository 122 for storage of browsing history data. Browsing history can include a list of content pages (e.g., web pages) and content sites (e.g., domains or web sites) a user has visited recently together with associated data such as page title, duration of visit, time of visit, elements of page content with which the user has interacted, timing of user interaction with content elements, timing and/or location of user zooming and scrolling within the page, and user interactions with browser modules, and can be recorded by the browser 120 for a predetermined period of time in order to provide the user with a history list and back/forward navigation options.

Browser 120 can also include browser features module 121 configured to provide the user with determined modules (for example, as discussed above, controls, toolbars, add-ins, plug-ins, widgets, skins, themes, etc.). For instance, the browser features module 121 can receive instructions in some embodiments from intermediary system 104 for configuring modules for a modified browser presentation for a particular content page. In some embodiments, browser features module 121 can access user preference data and/or content to modified presentation mappings to present a modified browser presentation or content layout to a user.

As illustrated, the browser 120 of the user device 102 can send browsing history data 215 to the logged user behaviors data repository 144 of the intermediary system 104. The browsing history data 215 can include page navigation data, bookmark data, content interaction data, device data, among other types of data representing user interactions with browser modules and content pages. In some embodiments, the browsing history data 215 can be accompanied by data representing information about user device 102, for example device type, display size, and configuration of browser 120, to name a few, as well as data representing information about the user, for example a stored user profile. The browser 120 can be configured such that browsing history data 215 is sent to the repository 144 periodically (for example, once per day, at the conclusion of each browsing session, etc.) or at the request of the intermediary system 104. In some implementations, the data 215 and page requests 205 can be sent from the browser 120 to the intermediary system 104 as a single request.

As illustrated in FIG. 1, intermediary system 104 can include headless browser 140. In some embodiments, the intermediary system 104 may instantiate the headless browser 140 to interface with the client browser 120 to request or receive browsing history data 215 and route received browsing history data 215 to the logged user behaviors repository 144. The intermediary system 104 may additionally or alternatively obtain browsing history data by virtue of being an intermediary (e.g., it may log the page requests 205 that it receives in association with a device or user ID). Data representing page requests and responses 205 can be logged by the intermediary system 104 as part of the browsing history data stored in the logged user behaviors data repository 144.

The dynamic content presentation generator 150 can receive the browsing history data 215 from the logged user behaviors data repository 144. For example, the dynamic content presentation generator 150 can be configured to update associations stored in the presentation to content mappings 160 at periodic intervals as needed for generating up-to-date modified presentations for content pages and browser interfaces. As discussed above, the browsing history data 215 can include interactions of a plurality of users with browser modules and content pages. Dynamic content presentation generator 150 can be configured to receive the browsing history data from the browser component on the computing devices of a plurality of browser users, identify, based at least partly on analyzing the user interactions, implicit and explicit indications of user preferences for browser interface configurations and content layouts, generate modified presentations of browser interfaces and/or content layouts based on the user preferences, and build a map associating content pages and categories of content pages with any corresponding modified presentations. In some embodiments, behavioral data associated with subgroups of the plurality of users (for example mobile device users) can be used to generate modified presentations specific to the subgroups.

For example, analysis module 152 can determine the implicit user preference indications by analyzing click (or touch) history data including length of time spent interacting with a particular element of a content page, absolute or relative number of users who interacted with the various elements of a content page, and length of time spent on a content page before interacting with a particular element. Accordingly, the implicit user preference indications can be used to determine elements that are relatively more popular or interesting to users, that is, which elements users interacted with more frequently, more quickly, or for longer periods of time, as well as which elements are relatively less popular or less interesting. Such element popularity, as determined based on aggregated user interactions, can be used by the presentation modification module 154 to generate modified layouts for specific content pages. Aggregated element popularity can be used by the presentation modification module 154 to generate general templates reflecting user preferences for locations of different types of content elements.

As another example, analysis module 152 can determine explicit user preference indications for browser interface configurations by analyzing the browsing history data to determine when a statistically significant number of users select a particular browser module when viewing a specific content page (e.g., onlineshopping.com) or category of content page (e.g., a plurality of online shopping sites). The user preference indications can accordingly indicate popular browser modules (that is, browser modules selected or used by the statistically significant number of users) and unpopular browser modules (that is, browser modules not selected or used by the statistically significant number of users) associated with the specific content page or category of content page. The presentation modification module 154 can use data regarding popular and unpopular browser modules to modify which modules are included in a browser interface for a given content page and/or an order of modules included in the browser interface. As discussed above, different user subgroups may be separately analyzed to associate a number of modified browser presentations with a content page, each modified browser presentation corresponding to a user subgroup.

In some embodiments, if an individual user's behavioral data indicates a preference for a specific content layout or browser module presentation, then the presentation modification module 154 can generate a user-specific modified presentation for the individual user. In some examples the browser 120 can determine the user-specific modified presentation and can override or supplement a modified presentation from the intermediary system 104.

The aggregate user preference data, modified browser presentations, modified content layouts, and general layout templates for each content page/page category can be sent as presentation data 230 for storage in the presentation to content mappings 160. In some embodiments, presentation data 230 can also include associations between subgroups of users and modified presentations specific to those subgroups.

The modified presentation generation technique performed by the dynamic content presentation generator 150 may be performed "offline" by the intermediary system at periodic or irregular intervals in order to provide the presentation to content mappings 160 with current, updated browser and content layout presentations. The user preference data and modified presentations stored in the presentation to content mappings 160 can be accessed in "real time" by the presentation utilization module 170 for use during user browsing sessions or as a monetized service (for example a data analytics service, content page restructuring service, or module/template marketplace). Presentation utilization module 170 can provide services to the browser 120 of the user device based on the user preference data and modified presentations.

Presentation utilization module 170 can include various modules for monetizing or otherwise utilizing the determined user preference data and modified presentations. For example, dynamic presentation module 160 can use modified presentations to present modified content page layouts and browser interface configurations to a user based on receiving a request from the user device for a content page and, in some embodiments, correlating information representing the user with a subgroup of users and causing presentation of a modified content page layout and/or browser module configuration associated with the subgroup.

In some embodiments, analytics portal 181 can provide a user interface for exposing the user preference data and modified presentations determined for a content page as a service in order to assist users (e.g., creators, developers, and/or managers of the pages) in increasing the quality of their content. Because the determined modified content layouts and browser configurations are based on user preferences for such modified presentations, users may wish to improve the organization of their pages or the features included in the browser for users visiting their pages in order to gain a competitive advantage, receive greater traffic, and thereby increase their sales and/or advertising revenue. Accordingly, the intermediary system 104 may provide analytics portal 181, for example as an application or content site, for presenting site owners with general information and tips for improving presentation of their content pages (e.g., place navigation options along an upper page portion, provide functionality for content sharing via social media as a browser feature) as well as detailed analytics of user interactions with their content pages (for example, 90% of users clicked on your link for more information, no users clicked on advertisement X, users tend to view your primary content for an average of 5 minutes before viewing advertisements, etc.) to assist site owners in improving their content.

Presentation utilization module 170 can also provide browser modules and content templates to users through the browser modules marketplace 162. For example, popular browser modules and content templates can be offered to content developers for use with their content pages. In some embodiments, a content developer may purchase or select an option to have their content page (and optionally the browser interface used when presenting the content page) updated automatically based on changes determined over time from updated browsing history data of the plurality of users of the intermediary system.

Example User Interfaces

Figure 3A:
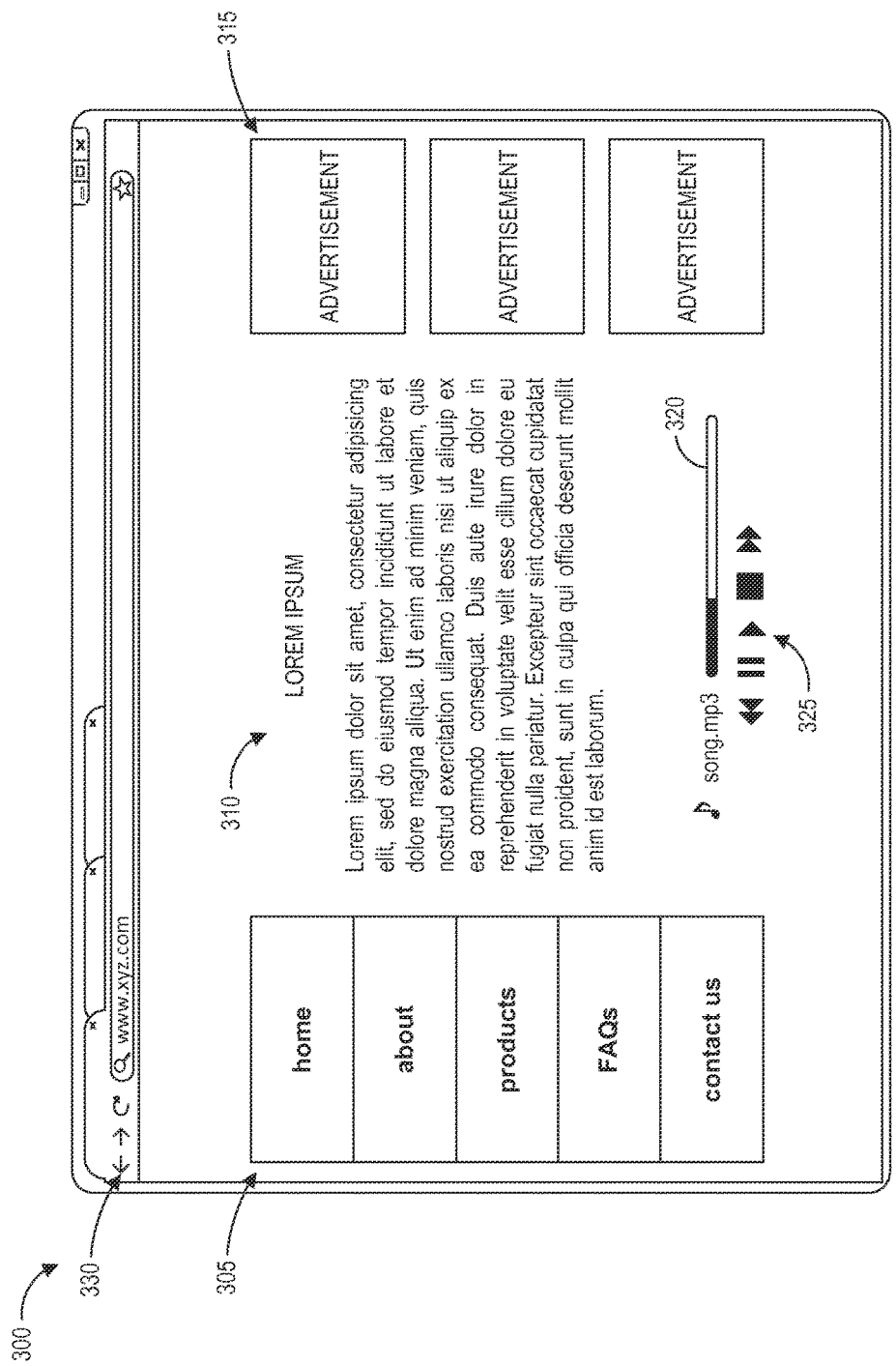
FIG. 3A is a user interface diagram of an illustrative initial user interface of a browser application and content page.

FIG. 3A is a diagram of a user interface 300 of an illustrative initial configuration for a browser application and an initial layout of a content page. The browser application includes a standard toolbar 330 that presents the user with navigation options, a field for entering uniform resource locators (URLs) and/or search data, and a page bookmarking option. The content page includes a number of elements including navigation options 305, primary text content 310, advertisements 315, audio content 320, and audio controls 325.

Figure 3B:
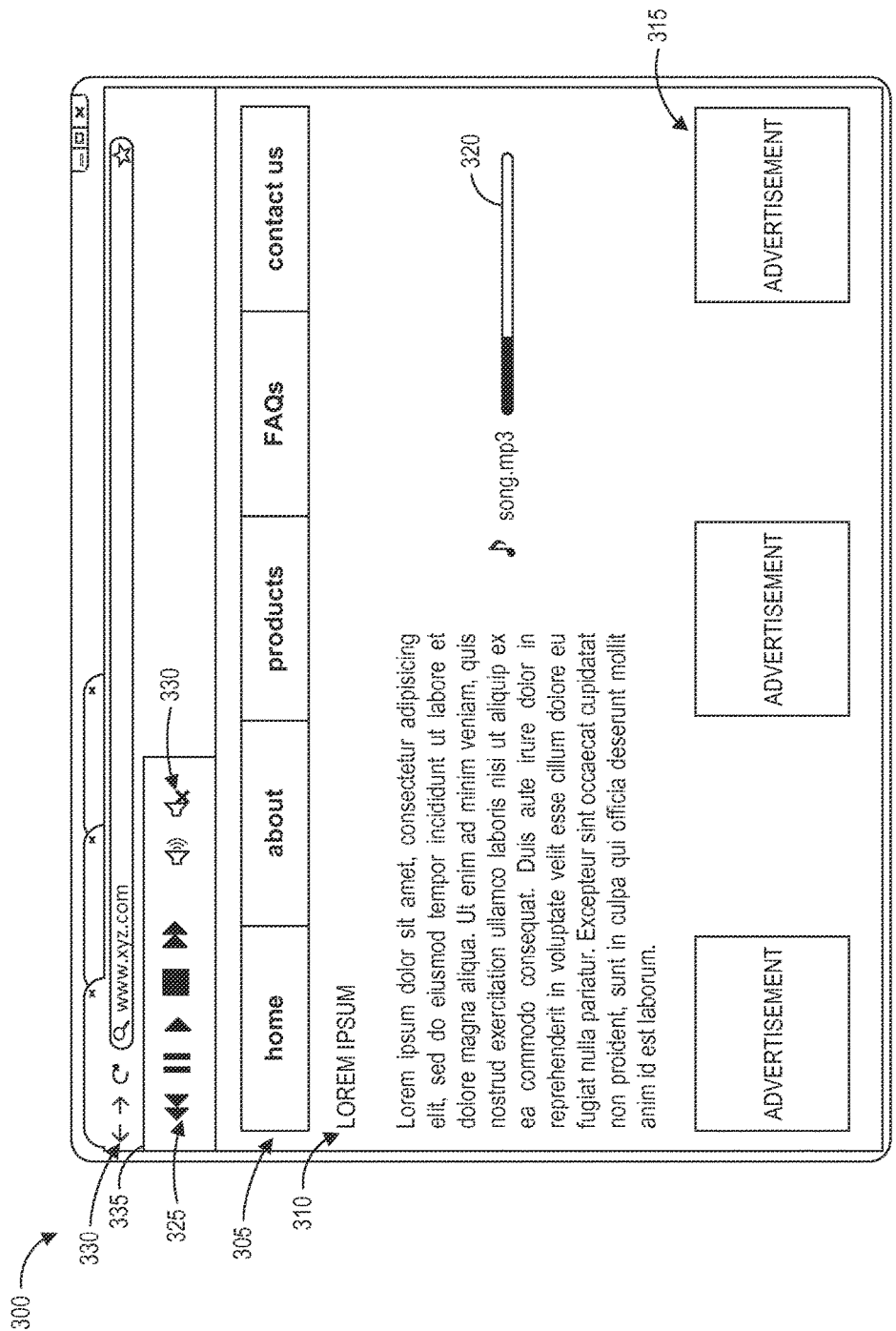
FIG. 3B is a user interface diagram of an illustrative modified presentation of a user interface providing features for managing audio content and an illustrative modified presentation of the content page of FIG. 3A.

FIG. 3B is a user interface diagram of an illustrative modified presentation of a user interface providing features for managing audio content and an illustrative modified presentation of the content page of FIG. 3A. As is apparent from the illustration, the layout of the page elements has been modified, for example by the dynamic content presentation generator 150. Aggregated user preference data can indicate a preference for navigation options 305 in an upper page portion, and accordingly in the modified layout the navigation options 305 are positioned horizontally along the top of the page rather than in the original vertical configuration along the left side of the page. Aggregated user preference data can indicate a preference for advertisements 315 positioned after primary content on a page, and accordingly in the modified layout the primary text content 310 and audio content 320 are positioned below the navigation options 305 and above the advertisements 315.

Further, user selections of browser modules when viewing pages with audio content can reveal a preference for audio control functionality in the browser interface. Accordingly, in the modified presentation of the browser an audio control module 335 is provided as part of the browser interface, the audio control module 335 including functionality for the user to interact with the audio file through playback controls 325 and volume controls 330.

Example Modified Presentation Determination Techniques

Figure 4:
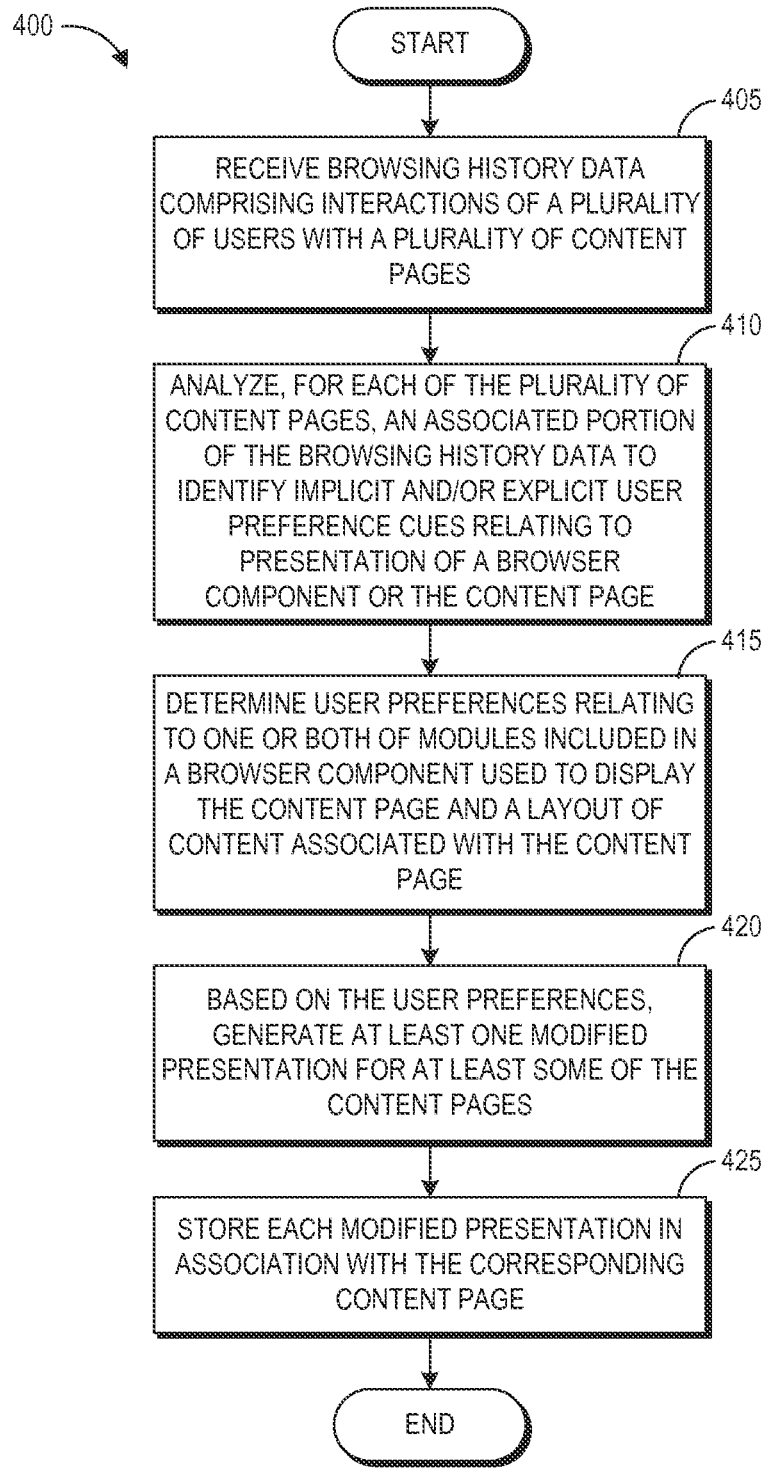
FIG. 4 illustrates an embodiment of a browser and/or content page presentation modification technique as implemented by an intermediary system.

FIG. 4 illustrates an embodiment of a browser and/or content page presentation modification technique 400 as implemented by an intermediary system 104.

At block 405, the intermediary system 104 can receive browsing history data comprising interactions of a plurality of users with a plurality of content pages. As discussed above, this data may be stored locally within browser applications 120 running on user devices 102 and transmitted to the intermediary system 104 at periodic intervals in one example. In other examples, the intermediary system 104 and/or content servers 106, 108 can log some or all of the user interactions instead of or in addition to the browser applications 120 running on user devices 102.

At block 410, the intermediary system 104 can analyze, for each of the plurality of content pages, an associated portion of the aggregated browsing history data to identify implicit and/or explicit user preference cues relating to presentation of a browser component and/or the content page. As discussed above, a portion of the aggregated browsing history data associated with one or more subgroups of users can be separately analyzed instead of or in addition to globally aggregated data for a content page in some embodiments. In some embodiments, the intermediary system 104 can analyze a portion of the aggregated browsing history data associated with a category of content pages to determine user preference cues relating to presentation of a browser component and/or content page for the category.

At block 415, the intermediary system 104 can determine user preferences relating to one or both of (1) modules included in the browser component used to display the content page and (2) a layout of content associated with the content page. For example, the implicit and/or explicit user preference cues can be analyzed to determine relative popularity of elements of a content page, user preference for specific page elements in certain locations, and/or modules used by a threshold number or statistically significant percentage of users in association with viewing a content page.

At block 420, based on the user preferences, the intermediary system 104 can generate at least one modified presentation for at least some of the content pages. The modified presentation can include one or more of a modified layout of the content, a template for content layout, and a modified presentation of the browser interface (including which modules to present and where to present the modules).

At block 425, the intermediary system 104 can store each modified presentation in association with the corresponding content page (or category of content pages). As discussed above, the stored modified presentations can be accessed to dynamically modify the presentation of content pages and browser interfaces to users during a browsing session, to make content templates and/or browser modules available in a marketplace, and to make user preference data and modified presentations available to content developers through an analytics portal. In some embodiments, the electronic marketplace accepts browser modules for distribution from both developers and third parties. The electronic marketplace can distribute, for example, browser modules that provide functionality for users to control or interact with content of a content page and/or aesthetic browser modifications not associated with user controls.

Figure 5:
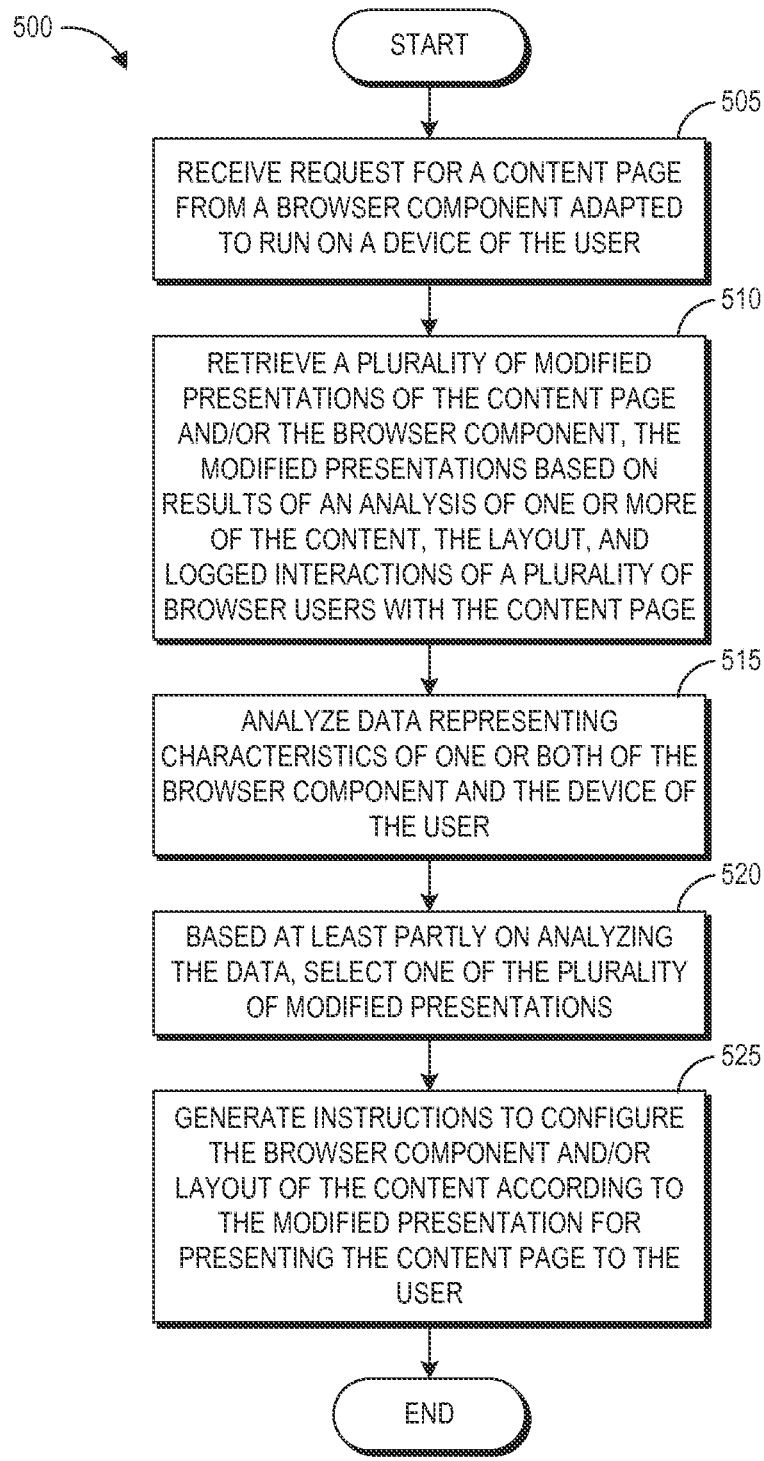
FIG. 5 illustrates an embodiment of a modified presentation technique as implemented by an intermediary system or a browser component on a user device.

FIG. 5 illustrates an embodiment of a modified presentation technique 500 as implemented by an intermediary system 104 or a browser component 120 on a user device 102. Any system with access to a data store of modified presentations associated with content pages or content page categories can perform the modified presentation technique 500.

At block 505, the intermediary system 104 receives a request for a content page from a browser component 120 adapted to run on a user device 102. According to typical headless browser functionality, some embodiments of the intermediary system 104 may fetch and pre-render the content associated with the requested page and deliver the pre-rendered content to the browser component 120. Some embodiments may not pre-render content, but may mediate content requests, content retrieval, and delivery of content according to the modified presentation techniques described herein.

At block 510, one or more modified presentations of the content page and/or the browser component can be retrieved. The modified presentations can be, as discussed above, generated based on analysis of aggregated user behavioral data and, in some embodiments, on analysis of the elements of page content. Retrieval of the modified presentation(s) can be accomplished in various embodiments by the intermediary system 104 or by the browser 120 if the browser 120 is configured to store or access presentation to content mappings 160. For purposes of example, the remaining blocks of the process 500 are described as being performed by the intermediary system 104. However, a browser 120 with access to presentation to content mappings 160 or some portion thereof may perform the process 500 without use of an intermediary system 104.

At block 515, the intermediary system 104 can analyze data representing characteristics of one or both of the browser component 120 requesting the content page and the device 102 hosting the browser component 120. Such characteristics can include display size, display resolution, type of browser, device type, connection bandwidth, and the like. Such characteristics can be used to associate the user with a particular subgroup of users, for example mobile device users.

At block 520, the intermediary system 104 can select one of a plurality of modified presentations associated with the requested content to present to the user based at least partly on analyzing the data at block 515 to associate the user with a particular subgroup. If no modified presentation is associated with the subgroup determined for the user then a general modified presentation may be selected. Blocks 515 and 520 may be omitted if only a single modified presentation is associated with the requested content.

At block 525, the intermediary system 104 generates instructions to configure the browser 120 on the user device 102 to configure the browser 120 according to a selected modified presentation for the browser 120 and/or to present the retrieved content according to the modified layout. The intermediary system 104 may generate instructions for the browser 120 to surface (and install, if necessary) a module or modules in the modified browser presentation in some embodiments.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by one or more processors or computing devices, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

For example, the process described with respect to FIG. 17 may be embodied in a set of executable program instructions stored on a computer-readable medium, such as one or more disk drives, of the computing system with which the intermediary system is associated. When the process is initiated, the executable program instructions can be loaded into memory, such as RAM, and executed by one or more processors of the computing system. In some embodiments, the computing system may include multiple computing devices, such as servers, and the process may be executed by multiple servers, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of dynamically modifying presentation of a content page, the method performed programmatically by one or more computing devices, the method comprising:
receiving a request for the content page from a browser application adapted to run on a device, the browser application comprising a graphical user interface to display content pages;
retrieving data representing content associated with the content page and a layout of the content;
retrieving logged interactions identifying browser modules presented in graphical user interfaces of browser applications that are used by a plurality of browser users to interact with content while viewing the content page;
analyzing the logged interactions to identify a browser module to add to a toolbar to generate a modified presentation of the graphical user interface of the browser application, wherein the browser module is different than modules of a default presentation of the graphical user interface of the browser application, the browser module comprising controls providing functionality to interact with one or more elements of the content associated with the content page; and
generating a visual representation of the modified presentation.

2. The method of claim 1, further comprising:
determining, based at least partly on the analysis of the content, that the content includes an audio file; and
providing a browser module including audio controls for inclusion in the modified presentation of the browser application.

3. The method of claim 1, further comprising:
determining, based at least partly on the analysis of the content, that the content includes an item in an electronic catalog and an option to purchase the item; and
providing a browser module including single click order functionality for the option to purchase the item for inclusion in the modified presentation of the graphical user interface of the browser application.

4. The method of claim 1, wherein the logged interactions include click history data of the plurality of users, the method further comprising determining a modified presentation of the layout of the content by at least:
determining, based at least partly the click history data, that an element of the content page is unpopular compared to at least one other element of the content page; and
generating the modified presentation of the layout of the content by removing or reorganizing the unpopular element.

5. The method of claim 1, further comprising logging and analyzing the interactions of the plurality of browser users with the browser modules.

6. A system for dynamically modifying content page presentation, the system comprising:
a browser application adapted to run on computing devices of a plurality of users, the browser application including a graphical user interface for displaying content pages, wherein the browser application is configured to cause storage of data representing interactions of the plurality of users with browser modules presented in the graphical user interface during display of particular content pages; and
an intermediary system in network communication with the browser application, in network communication with the browser application, the intermediary system comprising at least one processor configured to:
retrieve data associated with a content page, the data representing content associated with the content page and a layout of the content;
perform an analysis of a subset of the interactions corresponding to display of the content page to identify a browser module used to interact with content associated with the content page;
generate, based at least partly on the analysis, a modified presentation of the graphical user interface of the browser application, wherein the modified presentation of the graphical user interface of the browser application includes the browser module for display as part of the browser application, the module comprising controls providing functionality to interact with one or more components of the content associated with the content page; and
store the at least one modified presentation in association with the content page.

7. The system of claim 6, wherein, to determine the at least one modified presentation, the intermediary system is further configured to:
determine, based at least partly on analyzing a first subset of the interactions associated with a first category of users, a modified presentation for presentation to the first category of users; and
determine, based at least partly on analyzing a second subset of the interactions associated with a second category of users, a modified presentation for presentation to the second category of users, wherein the first category of users and the second category of uses are mutually exclusive.

8. The system of claim 7, wherein the first category of users are users of mobile computing devices and wherein the second category of users are users of desktop computing devices.

9. The system of claim 6, wherein the at least one modified presentation comprises a first modified presentation associated with a first subgroup of users and a second modified presentation associated with a second subgroup of users.

10. The system of claim 6, wherein the intermediary system is further configured to analyze data representing one or both of a browser application and a device of a user requesting the content page.

11. The system of claim 10, wherein the intermediary system is further configured to, based at least partly on analyzing the data, select for presentation to the user one of a plurality of modified presentations associated with the content page.

12. The system of claim 6, wherein the intermediary system is further configured to distribute the module via an electronic marketplace.

13. The system of claim 12, wherein the electronic marketplace accepts browser modules for distribution from both developers and third parties.

14. The system of claim 12, wherein the electronic marketplace additionally distributes aesthetic browser graphical user interface modifications.

15. The system of claim 6, wherein the intermediary system is further configured to provide to a developer of the content page, via a user data analytics service, data representing one or both of user preferences determined based on the analysis and the at least one modified presentation.

16. Non-transitory computer-readable medium storing instructions that, when executed, cause at least one computing device to perform a process comprising:
   receiving browsing history data comprising interactions between a plurality of users and browser modules presented in a graphical user interface of a browser application used while viewing particular content pages;
   analyzing at least a portion of the browsing history data associated with a content page of the particular content pages to determine aggregate user preferences relating to at least one module used to interact with content of the content page;
   generating, based at least partly on the aggregate user preferences, a modified presentation of the graphical user interface of the browser application, wherein the modified presentation of the graphical user interface of the browser application includes the at least one module for display as part of the browser application, the module comprising user-selectable options for managing at least a portion of the content of the content page; and
   storing the at least one modified presentation in association with the content page.

17. The non-transitory computer-readable medium of claim 16, wherein the aggregate user preferences further relate to a layout of content associated with the content page, the process further comprising generating a modified presentation of the layout of the content.

18. The non-transitory computer-readable medium of claim 17, wherein the browsing history data comprises click history data indicating user selection of portions of the content associated with the content page.

19. The non-transitory computer-readable medium of claim 17, the process further comprising generating the modified presentation of the layout of the content based at least partly on identifying, based on the click history data, relative popularity of elements of the content.

20. The non-transitory computer-readable medium of claim 19, the process further comprising providing data representing the relative popularity of the elements of the content to a manager of the content page via a data analytics service.

* * * * *